United States Patent [19]

Brenner

[11] Patent Number: 5,263,815
[45] Date of Patent: Nov. 23, 1993

[54] ENGINE MOUNTING FOR MOTOR VEHICLES

[75] Inventor: Heinrich Brenner, Ahrweiler, Fed. Rep. of Germany

[73] Assignee: Boge AG, Eitorf, Fed. Rep. of Germany

[21] Appl. No.: 805,095

[22] Filed: Dec. 9, 1991

[30] Foreign Application Priority Data

Dec. 24, 1990 [DE] Fed. Rep. of Germany ....... 4041837

[51] Int. Cl.$^5$ ............................................. F16F 13/00
[52] U.S. Cl. ...................................... 267/219; 180/300; 180/312; 248/562; 248/636; 267/140.11; 267/140.13
[58] Field of Search ................. 267/140.1 R, 140.1 A, 267/219; 180/300, 312, 902; 248/562, 636

[56] References Cited

U.S. PATENT DOCUMENTS

| | | |
|---|---|---|
| 4,262,886 | 4/1991 | Le Salver et al. ...... 267/140.1 A X |
| 4,378,936 | 4/1983 | Brenner ............................ 267/140.1 |
| 4,739,962 | 4/1988 | Morita et al. ............ 267/140.1 A X |
| 4,741,519 | 5/1988 | Dubos et al. .............. 267/140.1 R |
| 4,781,362 | 11/1988 | Reuter et al. ............ 267/140.1 A X |
| 4,955,589 | 9/1990 | West .................................. 267/219 X |
| 5,078,369 | 1/1992 | Pascal et al. .................. 267/140.1 A |

FOREIGN PATENT DOCUMENTS

| | | |
|---|---|---|
| 3024090 | 10/1981 | Fed. Rep. of Germany . |
| 3521246 | 1/1987 | Fed. Rep. of Germany ...... 267/219 |
| 2605693 | 4/1988 | France .................................. 180/312 |
| 149436 | 11/1980 | Japan ........................... 267/140.1 A |
| 37349 | 2/1984 | Japan .................................. 267/219 |

Primary Examiner—George E. A. Halvosa
Attorney, Agent, or Firm—Nils H. Ljungman & Associates

[57] ABSTRACT

An engine mounting for mounting an engine on the chassis of a motor vehicle has at least two fastening parts which are connected to one another with elastomeric springs. The engine mounting also has a hydraulic damping apparatus, and is configured so that the elastomeric springs have a hard shear-compression characteristic in two axes, and a soft shear characteristic in a third axis, the hydraulic damping apparatus being disposed in a direction parallel to the direction of the third axis.

12 Claims, 2 Drawing Sheets

ENGINE MOUNTING FOR MOTOR VEHICLES

BACKGROUND OF THE INVENTION

1. Field of the Invention:

This invention relates to an engine mounting for motor vehicles, the engine mounting comprising an elastic rubber bearing having a first member adapted to be secured to the vehicle chassis and a second member adapted to be connected to the vehicle engine. The first and second members can be connected to one another by means of at least one elastomer spring and a hydraulic damping apparatus. The hydraulic damping apparatus can have two chambers located adjacent one another and filled with damping fluid, and the two chambers can be connected to one another by means of a damping passage.

2. Background Information:

Known engine mountings, such as the one disclosed in Federal Republic of Germany Patent No. 30 24 090, which corresponds to U.S. Pat. No. 4,378,936, include elastic rubber bearings in which the fastening parts are connected to one another by means of an elastomer spring, and in which there is also disposed some sort of hydraulic damping apparatus. The elastomer spring basically consists of an outer, one-piece or multi-piece shear or thrust spring and an inner, ring-shaped rubber spring, which inner spring is essentially supported between a main body portion of the damping apparatus and one of the fastening parts. As a result of this configuration, the inner, ring-shaped rubber spring can absorb only a small proportion of the bearing load, whereby an effective damping of low frequency, high amplitude vibrations is achieved, while avoiding the damping of high frequency, low amplitude vibrations.

A bearing such as this can be viewed as having essentially three shear directions: a first, vertical or z direction in which the load of the engine is supported; a second, longitudinal or y direction in which the lateral load from cornering is supported; and a third, transverse or x direction perpendicular to both the z and y directions. As such, a disadvantage of such a bearing is that there is essentially no damping in the soft shear, or x direction, so that on account of the soft, low spring constants of the elastomer spring, large undamped movements between the fastening parts are possible. It is these large undamped movements which can result in a build up or amplification of resonance between the two bodies connected by the bearing.

OBJECT OF THE INVENTION

The object of the invention is to improve an elastic rubber bearing by providing the bearing with a soft characteristic which maintains riding comfort in the thrust direction of the bearing, whereby impacts in the rubber bearing are damped, axial deflections are reduced, and resonance amplification is prevented.

SUMMARY OF THE INVENTION

This object is achieved by a bearing in which the elastomer spring preferably has a hard shear-compression characteristic in two axes, and a soft shear characteristic in a third axis, and in which a hydraulic damping apparatus is preferably arranged parallel to the direction of the third axis.

An advantage of this configuration is that the rubber bearing can, for example, be designed as a roof bearing, and can be installed in the longitudinal direction of the motor vehicle. In other words, the bearing can be roof or dome shaped, and the longitudinal axis of the bearing can be aligned orthogonally to the longitudinal direction of the motor vehicle so that the transverse dimension of the bearing is aligned with the longitudinal direction of the motor vehicle.

In such an installation, the static, or vertical load, along with the lateral load from cornering forces, can be absorbed by the hard shear-compression characteristic of the elastomer spring in the vertical $C_z$ and longitudinal $C_y$ directions, respectively. In the direction $C_x$ of the soft shear characteristic of the elastomer spring, transverse to the longitudinal and vertical directions, the damping apparatus can be connected in such a manner that the damping axis is parallel to the $C_x$ direction. Consequently, the soft characteristic of the elastomer spring is retained in the shear, or $C_x$ direction, to thereby allow for a comfortable ride, while any impacts which occur are damped, axial deflections are reduced, and a resonance amplification is prevented.

In one embodiment of the present invention, the fluid chambers can preferably be located in one of the fastening parts. In this configuration, the damping apparatus can be integrated into the elastic rubber bearing so that no special damper is necessary.

In accordance with an additional embodiment of the present invention, the fastening parts can preferably be designed with a cambered shape or an angled or V-shape, and two elastomer springs can preferably be oriented at an angle to one another. The damping apparatus can thereby advantageously be located in the free space located between the two cambered or V-shaped fastening pieces.

In an additional embodiment of the present invention, each of the fluid chambers can preferably be closed on their end surface by means of a cap-like elastic membrane. The elastic membrane can thereby preferably be designed as a closure for the chambers, can preferably be in contact under a slight prestress against the outer fastening part, and can preferably be moved by the outer fastening part during each spring deflection in the direction $C_x$, so that damping occurs as a result of the displacement of fluid from one chamber into the other.

In another additional embodiment of the present invention, the damping passage connecting the fluid chambers can preferably be designed as a hole in the fastening part, or, the damping passage can also be designed so that the passage is ring-shaped and disposed about the center axis of the chambers.

In another additional embodiment of the present invention, at least one of the fluid chambers can preferably be equipped with a decoupling membrane, and/or at least one bypass valve can be oriented in parallel with the damping passage.

One aspect of the invention resides broadly in an engine mount for mounting an engine to the chassis of a motor vehicle or the like. The engine mount comprises a first member for being connected to one of the vehicle chassis and the engine, a second member for being connected to the other of the vehicle chassis and the engine, a resilient member disposed between and intimately connected to each of the first member and the second member, and hydraulic damping apparatus disposed between the first and the second member for damping relative movement between the first and the second member. The hydraulic damping apparatus defines a first transverse axis of the engine mount along which axis the damping occurs. The engine mount has at least one additional axis disposed angularly to the first transverse axis. The resilient member is configured for providing a hard displacement characteristic along the at least one additional axis, and the resilient member is configured for providing a soft displacement characteristic along the first transverse axis, the hard displacement characteristic being substantially harder than the soft displacement characteristic.

Another aspect of the invention resides broadly in a hydraulically damping elastomer bearing for damping vibrations between two masses. The bearing comprises a first member for being connected to one of the two masses, a second member for being connected to the other of the two masses, a resilient member disposed between and intimately connected to each of the first member and the second member, and hydraulic damping apparatus disposed between the first and the second member for damping relative movement between the first and the second member. The hydraulic damping apparatus defines a first transverse axis of the engine mount along which axis the damping occurs. The hydraulic damping apparatus comprises at least a first and a second fluid chamber disposed about the second member and in contact with each of the first member and the second member and filled with a hydraulic fluid, and at least one fluid passage connected between the at least a first and a second fluid chamber to allow passage of the hydraulic fluid between the at least a first and a second fluid chamber. The engine mount has at least one additional axis disposed angularly to the first transverse axis. The resilient member is configured for providing a hard displacement characteristic along the at least one additional axis, and the resilient member is configured for providing a soft displacement characteristic along the first transverse axis, the hard displacement characteristic being substantially harder than the soft displacement characteristic.

BRIEF DESCRIPTION OF THE DRAWINGS

The preferred embodiments of the invention are schematically illustrated in the accompanying drawings, in which.

DESCRIPTION OF THE PREFERRED EMBODIMENTS

Figure 1:
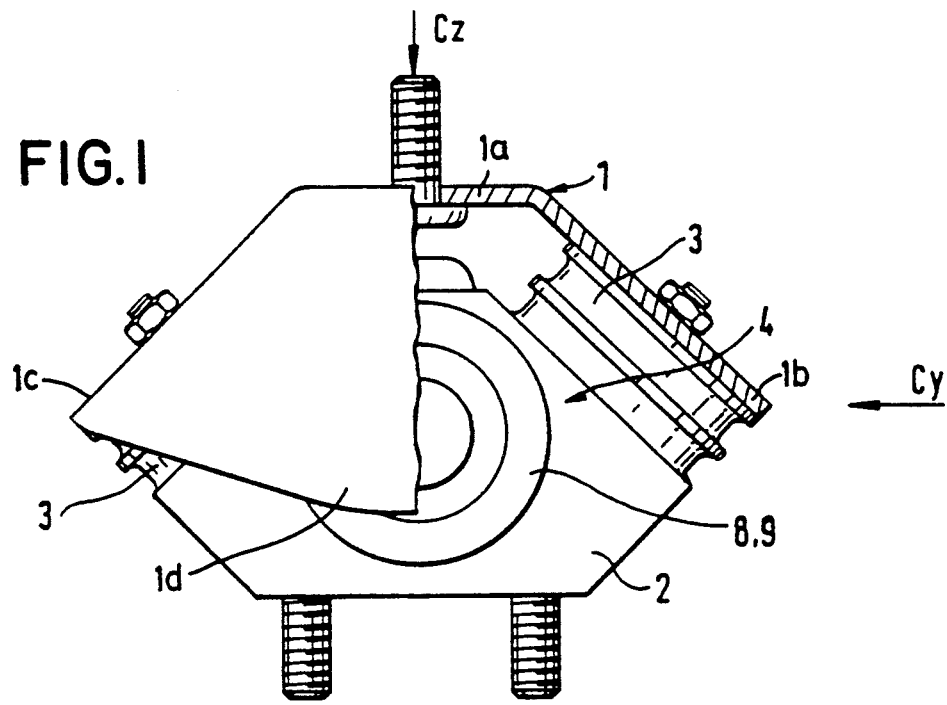
FIG. 1 shows an elastic rubber bearing.

The elastic rubber bearing illustrated in FIG. 1 can preferably include two fastening parts 1 and 2, of which the fastening part 1 may be configured to be connected to a vehicle engine, and the fastening part 2 may be configured to be connected to a vehicle chassis. The two fastening parts 1 and 2 are preferably connected to one another by means of at least one resilient member 3, such as a spring preferably made of elastomeric material. There can also preferably be a damping apparatus 4 located essentially within the inner area defined by the elastic rubber bearing. The elastic rubber bearing preferably has a relatively hard shear-compression characteristic in the direction of the axes Cy and Cz. An additional axis Cx runs perpendicular to the plane of the drawing, and is further illustrated in FIG. 2.

Figure 2:
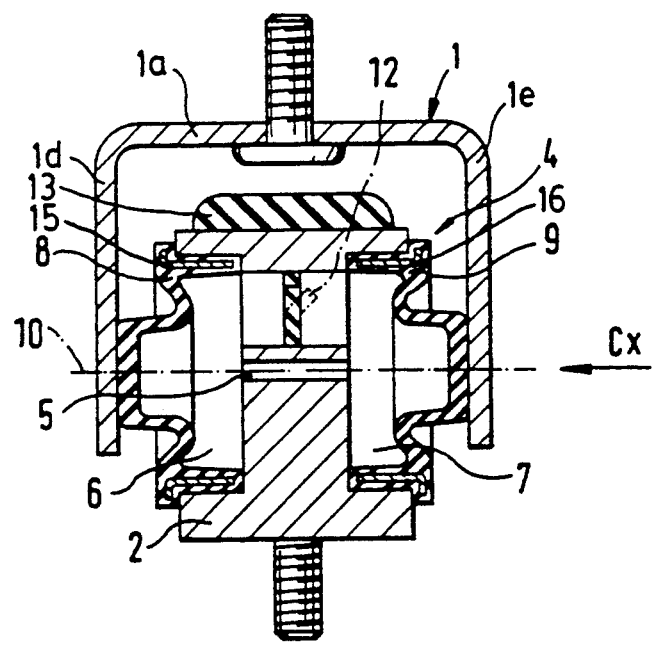
FIG. 2 shows a cross section through the rubber bearing illustrated in FIG. 1, taken along the direction indicated by the arrow Cz.

FIG. 2 shows a detail of one embodiment of a hydraulic damping apparatus 4. The damping apparatus can preferably have a stop block 13 for limiting any relative movement in the Cz direction. This stop block 13 can also preferably be constructed of elastomeric material to absorb any large impacts which may occur in the Cz direction. Also, in the vicinity of the fastening piece 2 there can preferably be at least two fluid chambers 6 and 7, which can preferably be connected to one another by means of a damping passage 5. In this embodiment, the damping passage 5 is illustrated as a narrow diameter bore directly connecting the two fluid chambers, while additional configurations of such a passage are also possible. The damping passage 5, which in this figure is designed as a hole, can preferably be located in the vicinity of the center axis 10 of the fastening part 2, and directly within the fastening part 2. Between the chambers 6 and 7, there can also be a bypass valve 12 connected in parallel to the damping passage 5 if such a bypass valve is desired for altering the damping characteristics of the bearing.

On the end surfaces of the damping apparatus 4, the chambers 6 and 7 can preferably be closed off by means of cap-like membranes 8 and 9. These cap-like membranes 8 and 9 can each preferably be in contact, under slight prestress, against opposite sides of the outer fastening part 1, so that when there is a spring deflection in the direction Cx, a flow of damping fluid will generally occur within the damping passage 5 connecting the chambers 6 and 7. Such a fluid flow essentially causes an appropriate damping of any relative movement of the fastening part 1 in relation to the fastening part 2 along the direction Cx.

As is shown in FIGS. 1 and 2, the fastening parts 1 and 2 may preferably be dome shaped and complementary to one another so that the fastening part 1 essentially fits over and partially surrounds the fastening part 2. The fastening part 1 may preferably have a substantially planar portion 1a for being attached to an engine or chassis, and two angularly disposed arms 1b and 1c disposed at preferably about 45° relative to the planar portion 1a. These two arms 1b and 1c are for being attached to the spring means 3. In addition to the portions 1a–1c, there may also preferably be two arm portions 1d and 1e for contacting the cap-like membranes 8 and 9, which two additional arm portions 1d and 1e are preferably disposed at 90° relative to the portions 1a–1c.

The fastening part 2 can preferably be configured in complementary manner with the fastening part 1 so that the two spring means are preferably disposed at 90° relative to one another, and so that the two fluid chambers 6 and 7 are preferably disposed substantially linearly with respect to one another. In addition, the cap-like membranes 8 and 9 of the fluid chambers 6 and 7 of fastening part 2 can have preferably ring shaped reinforcement members 15 and 16 disposed about their periphery sections. These reinforcement members can preferably be formed from a relatively stiff material such as metal or hard plastic, etc., and provide support for the peripheral portion of cap-like membranes 8 and 9 so that the cap-like membranes 8 and 9 remain tightly sealed against the walls of the fastening piece 2. These cap-like membranes are also preferably "bellow"

shaped to allow for compression and extension of the membrane.

Figure 3:
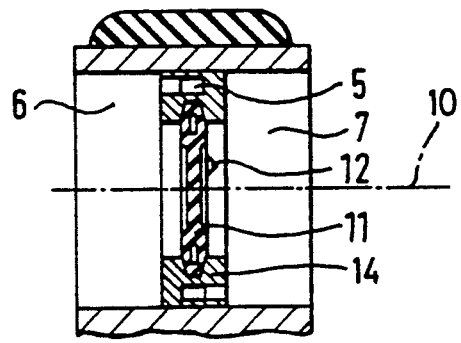
FIG. 3 shows a cross section of one embodiment of a partition located between the two chambers.

FIG. 3 shows an additional embodiment of a partition 14 that can be located between the chambers 6 and 7. In this cross-sectional view, the damping passage 5 is preferably designed as a ring-shaped passage disposed to at least partially encircle the center axis 10. The length and cross-section of the damping passage 5 can essentially be configured as necessary depending upon the desired damping effect required for particular applications. In such an embodiment, with the passage 5 being ring-shaped, the inlet and outlet openings of the passage into the chambers 6 and 7 can generally be positioned to enter into each of the chambers 6 and 7 at spaced apart locations disposed at predetermined positions around the center axis 10, depending on the damping desired.

Figures 4A, 4B, 4C:
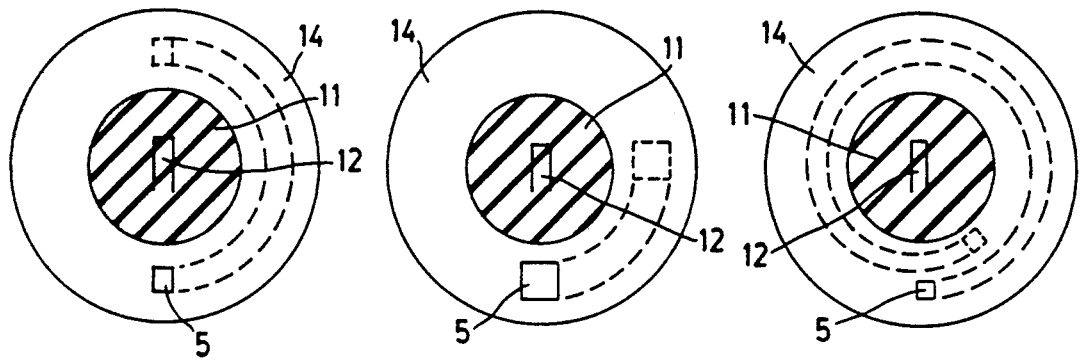
FIGS. 4a–4c show plane views of various embodiments of the partition for separating the two fluid chambers.

Various embodiments of the partition 14 with the passage 5 located therein, are shown in FIGS. 4a–4c in which the passage 5 is shown having various lengths and cross-sections.

Figure 5:
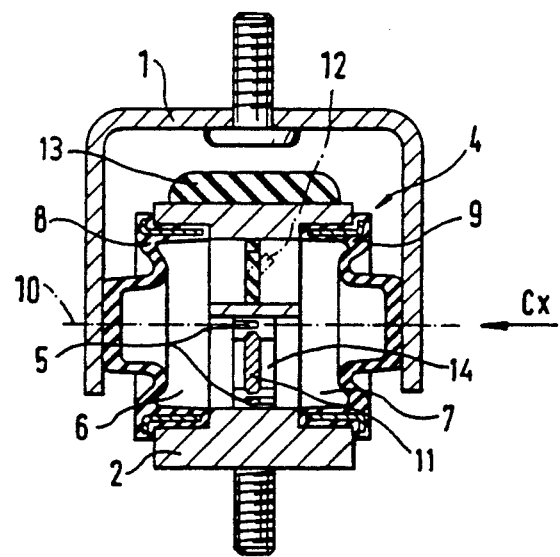
FIG. 5 shows an additional embodiment of the bearing which essentially combines some of the features as shown in FIGS. 2 and 3.

In the center area of the component containing the damping passage 5, there can also be a decoupling membrane 11 and/or a bypass valve 12. Such a decoupling membrane can be made of a flexible material to at least partially flex to absorb some of the initial shock provided upon a thrust in the Cx direction. In this configuration, the bypass valve 12 is shown as being located within the decoupling membrane, however, depending on the desired effect, the bypass valve could also be located in various other positions such as within the fastening piece 2, as shown in FIG. 5.

In summary, one feature of the invention resides broadly in an elastic rubber bearing with at least two fastening parts which are connected to one another by means of at least one elastomer spring, and with a hydraulic damping apparatus, consisting of two chambers located adjacent one another, filled with damping fluid, and connected to one another by means of a damping passage, the bearing being characterized by the fact that the elastomer spring always has a hard shear-compression characteristic in two axes (Cy, Cz), and a soft shear characteristic in a third axis (Cx), and that the hydraulic damping apparatus is oriented parallel to the elastomer spring, in the direction of the third axis (Cx).

Another feature of the invention resides broadly in a rubber bearing characterized by the fact that the chambers 6 and 7 are located in one of the fastening parts 1 and 2.

Yet another feature of the invention resides broadly in a rubber bearing characterized by the fact that the fastening parts 1 and 2 are designed with a cambered shape, and that two elastomer springs 3 are oriented at an angle to one another.

A further feature of the invention resides broadly in a rubber bearing according to claim 1, characterized by the fact that the chambers 6 and 7 are closed on their end surfaces with cap-shaped elastic membranes 8 and 9.

A yet further feature of the invention resides broadly in a rubber bearing characterized by the fact that the damping passage 5 is designed as a hole in the fastening part 1.

A still further feature of the invention resides broadly in a rubber bearing characterized by the fact that the damping passage 5 runs in a ring shape around the center axis 10 of the chambers 6 and 7.

A still further feature of the invention resides broadly in a rubber bearing characterized by the fact that at least one chamber 6 or 7 is equipped with a decoupling membrane 11.

A still further feature of the invention resides broadly in a rubber bearing characterized by the fact that parallel to the damping passage 5 there is at least one bypass valve 12 between the chambers 6 and 7.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. An engine mount, for mounting an engine to the chassis of a motor vehicle or the like, said engine mount comprising:

a plurality of extremities;

a first member being configured for being connected to one of the vehicle chassis and the engine, said first member having a first connection surface at one extremity of said engine mount, said first connection surface for being connected to said one of the vehicle chassis and the engine;

a second member being configured for being connected to the other of the vehicle chassis and the engine, said second member having a second connection surface at another extremity of said engine mount, said second connection surface for being connected to said other of the vehicle chassis and the engine;

said second connection surface being disposed opposite said first connection surface;

resilient member means disposed between and intimately connected to each of said first member and said second member;

hydraulic damping means disposed between said first member and said second member for damping relative movement between said first member and said second member;

said hydraulic damping means defining a first transverse axis of said engine mount along which said damping occurs;

said engine mount having a longitudinal axis perpendicular to said first transverse axis;

said engine mount having a third axis, said third axis being perpendicular to both said longitudinal axis and said first transverse axis, and said third axis passing through and being transverse to each of said first and second connection surfaces;

said third axis and said longitudinal axis defining a plane, said plane being perpendicular to said first transverse axis;

said resilient member means being configured for providing a hard displacement characteristic along said third axis and said longitudinal axis;

said resilient member means being configured for providing a soft displacement characteristic along said first transverse axis, said hard displacement characteristic being substantially harder than said soft displacement characteristic; and said resilient member means comprising two elastomer spring means, each having a compressional axis, the compressional axis of one of said spring means being disposed at an angle with respect to the compressional axis of the other of said spring means, the compressional axes being disposed to provide said hard displacement characteristic in a substantial portion of said plane upon simultaneous compression of said two spring means; and wherein:

said compressional axes of said two elastomer spring means are disposed in said plane; and said first and second connection surfaces are intersected by said plane; and said engine mount further comprising:

a first threaded part connected to said first connection surface, said first threaded part for being connected to said one of the vehicle chassis and the engine; and a second threaded part connected to said second connection surface, said second threaded part for being connected to said other of the vehicle chassis and the engine;

wherein said two elastomer spring means are at least partially exposed to the environment surrounding said engine mount;

wherein said angle between said compressional axes of said two elastomer spring means is substantially an angle of 90°; and wherein:

said hydraulic damping means comprises:

at least a first and a second fluid chamber disposed between said first member and said second member and in contact with each of said first member and said second member, said at least a first and a second fluid chamber being filled with a hydraulic fluid; and at least one fluid passage connected between said at least a first and a second fluid chamber to allow passage of the hydraulic fluid between said at least a first and a second fluid chamber;

said first member comprises at least two arm portions disposed angularly at about 135° with respect to said first connection surface, said at least two arm portions for being fastened to said two elastomer spring means; and said first threaded part and said second threaded part are disposed at an angle of 180° with respect to one another; and wherein said first member further comprises at least two additional arm portions disposed at about 90° with respect to said first connection surface.

2. The engine mount according to claim 1 wherein:
said at least a first and a second fluid chamber are disposed substantially within said second member on opposite sides of said second member; and
said at least one fluid passage comprises a passage within said second member connected between said at least a first and a second fluid chamber.

3. The engine mount according to claim 2, wherein said hydraulic damping means additionally comprises at least one bypass valve disposed between said at least a first and a second fluid chamber, said at least one bypass valve for opening and closing said passage to alter the damping characteristics of said engine mount.

4. The engine mount according to claim 3, wherein:
each of said at least a first and a second fluid chamber have an end disposed away from said second member;
said end of each of said at least a first and a second fluid chamber comprises an elastic membrane.

5. The engine mount according to claim 4, wherein:
each of said elastic membranes is cap-shaped; and
each of said elastic membranes is pre-compressed between said second member and said first member.

6. The engine mount according to claim 5, wherein:
each of said elastic membranes of each end is in contact with a portion of said first member so that relative movement between said first member and said second member in a direction along said first transverse axis displaces one of said elastic membranes and forces the hydraulic fluid to flow from at least one of said at least a first and second fluid chamber to the other;
said two elastomer spring means are disposed spaced apart within said plane;
said two elastomer spring means are configured for providing said hard shear-compression characteristic along said third axis and said longitudinal axis, and said soft shear characteristic along said first transverse axis;
at least one of said first member and said second member comprises elastic stop means for limiting displacement between said first member and said second member along said third axis;
said bypass valve means comprises a flexible flap disposed between said first fluid chamber and said second fluid chamber;
said at least two additional arm portions are for contacting said elastic membrane of said at least a first and a second fluid chamber;
said second member comprises a portion having a configuration complementary to said first member;
said first threaded part extends outward from said first connection surface;
said second threaded part extends outward from said second connection surface;
said engine mount comprises two bolts, one of said bolts intimately connecting one of said two elastomer spring means to each of said first member and said second member, and the other of said two bolts intimately connecting the other of said two elastomer spring means to each of said first member and said second member;
said elastic membranes of said at least a first and a second fluid chamber comprise reinforcement means for retaining said elastic membranes within said second member and for providing a seal between said elastic membranes and said second member; and
said elastic membranes of said at least a first and a second fluid chamber comprise at least one bellow-shaped fold for allowing extension and compression of said elastic membranes.

7. The engine mount according to claim 1, wherein:
said at least a first and a second fluid chamber are separated by a partition, said partition having a central axis; and said fluid passage comprises a fluid passage disposed at least partially about the central axis of said partition.

8. The engine mount according to claim 7, wherein:
said partition comprises a decoupling membrane; and
said hydraulic damping means additionally comprises at least one bypass valve disposed between said at least a first and a second fluid chamber in parallel with said at least one fluid passage.

9. A hydraulically damping elastomer bearing for damping vibrations between two masses, said bearing comprising:
a first member being configured for being connected to one of the two masses, said first member having a first connection surface for being connected to said one of the two masses;
a second member being configured for being connected to the other of the two masses, said second member having a second connection surface for being connected to said other of the two masses;
said second connection surface being disposed opposite said first connection surface at an angle of 180° with respect thereto;
resilient member means disposed between and intimately connected to each of said first member and said second member;
hydraulic damping means disposed between said first member and said second member for damping relative movement between said first member and said second member;
said hydraulic damping means defining a first transverse axis of said bearing along which said damping occurs;
said hydraulic damping means comprising:
at least a first and a second fluid chamber disposed between said first member and said second member and in contact with each of said first member and said second member, said at least a first and a second member being filled with a hydraulic fluid; and
at least one fluid passage connected between said at least a first and a second fluid chamber to allow passage of the hydraulic fluid between said at least a first and a second fluid chamber;
said bearing having a longitudinal axis perpendicular to said first transverse axis;
said bearing having a third axis, said third axis being perpendicular to both said longitudinal axis and said first transverse axis, and said third axis passing through and being transverse to each of said first and second connection surfaces;
said third axis and said longitudinal axis defining a plane, said plane being perpendicular to said first transverse axis;
said resilient member means being configured for providing a hard displacement characteristic along said third axis and said longitudinal axis;
said resilient member means being configured for providing a soft displacement characteristic along said first transverse axis, said hard displacement characteristic being substantially harder than said soft displacement characteristic;
said resilient member means comprising two elastomer spring means, each having a compressional axis, the compressional axis of one of said spring means being disposed at an angle with respect to the compressional axis of the other of said spring means, the compressional axes being disposed to provide said hard displacement characteristic in said plane;
said compressional axes of said two elastomer spring means being disposed in said plane;
said first and second connection surfaces being intersected by said plane;
a first threaded part connected to said first connection surface, said first threaded part for being connected to said one of the two masses; and
a second threaded part connected to said second connection surface, said second threaded part for being connected to said other of the two masses;
said two elastomer spring means being at least partially exposed to the environment surrounding said bearing; wherein:
said two elastomer spring means are disposed spaced apart within said plane;
said angle between said compressional axes of said two elastomer spring means is substantially an angle of 90°;
said two elastomer spring means are configured for providing a hard shear-compression characteristic along said third axis and said longitudinal axis, and a soft shear characteristic along said first transverse axis;
said first member comprises at least two arm portions disposed angularly at about 135° with respect to said first connection surface, said at least two arm portions for being fastened to said two elastomer spring means;
said first member further comprises at least two additional arm portions disposed at about 90° with respect to said first connection surface; and
said first threaded part and said second threaded part are disposed at an angle of 180° with respect to one another.

10. The bearing according to claim 9, wherein:
each of said at least a first and a second fluid chamber have an end disposed away from said second member, and said end of each of said at least a first and a second fluid chamber comprises an elastic membrane at least partially compressed between said first member and said second member;
at least one of said first member and said second member comprises elastic stop means for limiting displacement between said first member and said second member along said third axis;
said hydraulic damping means comprises bypass valve means, and said bypass valve means comprise a flexible flap disposed between said first fluid chamber and said second fluid chamber;
said at least two additional arm portions are for contacting said elastic membrane of said at least a first and a second fluid chamber;
said second member comprises a portion having a configuration complementary to said first member;
said first threaded part extends outward from said first connection surface;
said second threaded part extends outward from said second connection surface;
said bearing comprises two bolts, one of said bolts intimately connecting one of said two elastomer spring means to each of said first member and said second member, and the other of said two bolts intimately connecting the other of said two elastomer spring means to each of said first member and said second member;

said elastic membranes of said at least a first and a second fluid chamber comprise reinforcement means for retaining said elastic membranes within said second member and for providing a seal between said elastic membranes and said second member; and said elastic membranes of said at least a first and a second fluid chamber comprise at least one bellow-shaped fold for allowing extension and compression of said elastic membranes.

11. An engine mount for mounting an engine to the chassis of a motor vehicle or the like, said engine mount comprising:

a plurality of extremities;

a first member being configured for being connected to one of the vehicle chassis and the engine, said first member having a first connection surface at one extremity of said engine mount, said first connection surface for being connected to said one of the vehicle chassis and the engine;

a second member being configured for being connected to the other of the vehicle chassis and the engine, said second member having a second connection surface at another extremity of said engine mount, said second connection surface for being connected to said other of the vehicle chassis and the engine;

said second connection surface being disposed opposite said first connection surface;

resilient member means disposed between and intimately connected to each of said first member and said second member;

hydraulic damping means disposed between said first member and said second member for damping relative movement between said first member and said second member;

said hydraulic damping means defining a first transverse axis of said engine mount along which said damping occurs;

said hydraulic damping means comprising at least a first and a second fluid chamber disposed between said first member and said second member and in contact with each of said first member and said second member, said at least a first and a second fluid chamber being filled with a hydraulic fluid;

said engine mount having a longitudinal axis perpendicular to said first transverse axis;

said engine mount having a third axis, said third axis being perpendicular to both said longitudinal axis and said first transverse axis, and said third axis passing through and being transverse to each of said first and second connection surfaces;

said third axis and said longitudinal axis defining a plane, said plane being perpendicular to said first transverse axis;

said resilient member means being configured for providing a hard displacement characteristic along said third axis and said longitudinal axis;

said resilient member means being configured for providing a soft displacement characteristic along said first transverse axis, said hard displacement characteristic being substantially harder than said soft displacement characteristic;

said resilient member means comprising two elastomer spring means, each having a compressional axis, the compressional axis of one of said spring means being disposed at an angle with respect to the compressional axis of the other of said spring means, the compressional axes being disposed to provide said hard displacement characteristic in a substantial portion of said plane upon simultaneous compression of said two spring means;

said compressional axes of said two elastomer spring means being disposed in said plane;

said first and second connection surfaces being intersected by said plane;

a first threaded part connected to said first connection surface, said first threaded part for being connected to said one of the vehicle chassis and the engine; and a second threaded part connected to said second connection surface, said second threaded part for being connected to said other of the vehicle chassis and the engine;

said first member comprising:

at least two arm portions disposed angularly with respect to said first connection surface, said at least two arm portions for being, fastened to said two elastomer spring means; and at least two additional arm portions disposed angularly with respect to said first connection surface, said at least two additional arm portions for contacting said at least a first and a second fluid chamber;

said second member comprises a portion having a configuration complementary to said first member; wherein:

said at least two arm portions are disposed angularly at about 135° with respect to said first connection surface;

said at least two additional arm portions are disposed at about 90° with respect to said first connection surface;

said first threaded part extends outward from said first connection surface;

said second threaded part extends outward from said second connection surface;

said first threaded part and said second threaded part are disposed at an angle of 180° with respect to one another;

said hydraulic damping means further comprises at least one fluid passage connected between said at least a first and a second fluid chamber to allow passage of the hydraulic fluid between said at least a first and a second fluid chamber;

said two elastomer spring means are disposed spaced apart within said plane;

said two elastomer spring means are configured for providing a hard shear-compression characteristic along said third axis and said longitudinal axis, and a soft shear characteristic along said first transverse axis;

said two elastomer spring means are at least partially exposed to the environment surrounding said engine mount; and said angle between said compressional axes of said two elastomer spring means is substantially an angle of 90°.

12. The engine mount according to claim 11, wherein:

said at least a first and a second fluid chamber are disposed substantially within said second member on opposite sides of said second member;

said at least one fluid passage comprises a passage within said second member connected between said at least a first and a second fluid chamber;

said hydraulic damping means additionally comprises at least one bypass valve disposed between said at least a first and a second fluid chamber;

said bypass valve means comprises a flexible flap disposed between said first fluid chamber and said second fluid chamber;

each of said at least a first and a second fluid chamber have an end disposed away from said second member;

said end of each of said at least a first and a second fluid chamber comprises an elastic membrane;

each of said elastic membranes of each end is in contact with a portion of said first member so that relative movement between said first member and said second member in a direction along said first transverse axis displaces one of said elastic membranes and forces the hydraulic fluid to flow from at least one of said at least a first and second fluid chamber to the other; and said engine mount comprises two bolts, one of said bolts intimately connecting one of said two elastomer spring means to each of said first member and said second member, and the other of said two bolts intimately connecting the other of said two elastomer spring means to each of said first member and said second member.

* * * * *